United States Patent Office 3,058,591
Patented Oct. 16, 1962

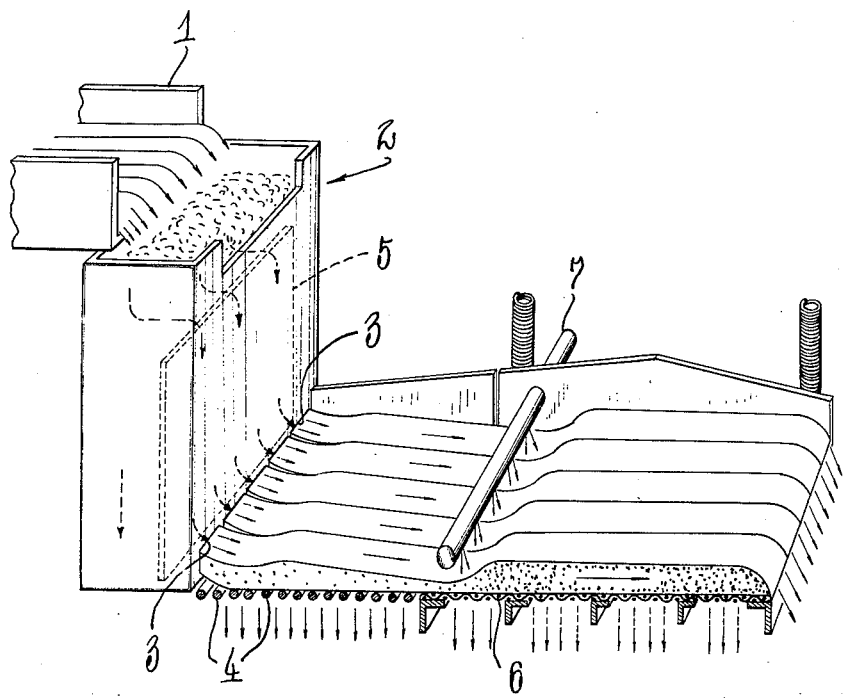

3,058,591
JET TYPE APPARATUS FOR CLASSIFYING, DEWATERING AND RECOVERING SLACK OR OTHER FINE ORE
Chuji Nakahara, Hokkaido, Japan
(Nijimachi, Nougata-shi, Fukuoka-ken, Japan)
Filed June 1, 1959, Ser. No. 817,176
Claims priority, application Japan Oct. 3, 1955
2 Claims. (Cl. 209—273)

The present invention relates to methods and apparatus for classifying, screening, dewatering and recovering fine coal and ore grains in coal and ore washing plants. According to the invention the fine grains are classified, screened, dewatered and recovered from a pulp which is obtained by combining washing water and grains. This application is a continuation-in-part application Serial No. 612,179 (now abandoned) filed September 26, 1956.

It is an object of the invention to provide an improved method for classifying, screening, dewatering and recovering fine coal and apparatus for making this method possible. The invention is characterized in that, there is provided apparatus for classifying, screening, dewatering and recovering fine coal from pulp comprising a hydraulic pressure pulp tank having a front end and an enervating plate in said tank dividing the interior thereof into two chambers. One of the chambers constitutes a large pulp reservoir rearwardly of the plate and the other chamber is a vertical narrow canal path which is forwardly of the plate. The tank includes a front wall which has a plurality of flat rectangular ejection apertures situated transversely in a row at the lower front end of the tank and in communication with the vertical narrow canal path. The apparatus further comprises a screen which is positioned approximately horizontally and adjacent the lowermost portion of the front end of the pulp tank. The apertures are positioned adjacent the screen and cause a rapid horizontal jet stream of pulp to be issued along the planar screen in which jet stream the particles are graduated depthwise in proportion to the density of the particles.

According to the method of the invention as related to the above apparatus, water and particles in the form of pulp are ejected from each of the ejection apertures along the surface of the planar screen under a determinable hydraulic pressure in which the stream the particles are graduated depthwise in proportion to their specific gravities. The stream of pulp is ejected from the apertures and passes in substantial quantity downwardly through the screen in a zone adjacent the apertures and along with only relatively dense particles having a size smaller than the mesh of the screen. The remainder of the water and particles are advanced along the screen and the particles are spread widely across the screen by the energy of the remainder of the water. Moreover, the particles are rapidly advanced forwardly along the screen by the energy of the remaining water. Moreover, the particles which are of relatively great density and of a size smaller than the mesh pass through the screen while the relatively light particles are advanced along the length of the screen to constitute an overproduct.

The above describes the apparatus of the present invention from a structural viewpoint. The following is presented to explain the function of the structure and the process of the invention.

In a coal or an ore washing plant, the present invention, when explained in terms of function and process of classifying, screening, dewatering and recovering fine particles of coal or ore, is characterized in the fact that (1) the different final velocities of the settling particles in the water is created due to the different specific gravities of the particles. The particles separate while the pulp has a gentle flow downwardly in the vertical narrow canal path, and (2) laminated flow layers are created due to the difference of the final velocity of settling of the particles when the pulp passes from a vertical downward gentle flow suddenly but smoothly into a rapid horizontal flow in the flat rectangular apertures, and (3) the abnormal shape of blade created, the laminated flow layers being ejected on the stationary screen from the flat rectangular aperture, the normal cross section of jet stream blade shape being suppressed since the greater part of the lower half of the blade occurring adjacent the aperture passes down through the screen. The above 3 natural phenomena occur in continuation in the order mentioned, and consequently, the jet stream satisfies the five conditions necessary for wet screening on said screen.

These five conditions are as follows:
(1) the product must move rapidly along the screen; (2) the meshes of the screen must always remain clear; (3) the particles of the product must be dispersed; (4) each particle must be freely rinsed with water; (5) clogging of the screen must be avoided.

Heretofore, methods and apparatus for the screening of fine coal have utilized motive power for enabling solids to be screened and to advance pulp on a screening surface. Heretofore, it has been contemplated to use either (1) a machine in the case of an approximately horizontal screen or (2) when mechanical power is not employed, an abrupt inclination of the surface of the screen thus utilizing gravity effects on the solids to be screened. There were no other means for screening utilized on an industrial scale besides the above techniques.

The method of the present invention is novel in that the flow energy of the ejected stream of water is used instead of gravity or mechanical power to both remove and advance solids on the screen.

In the method of the present invention for classifying, screening, dewatering and recovering, various phenomena take place continuously after discharge of the pulp from the vertical canal path onto a single planar screen, which phenomena, act continuously and in sequence to effect classifying, screening, dewatering and recovering of fine coal particles on the horizontal screen. These phenomena include:

(I) The solids to be screened are propelled, by the flow energy of water on the fixed planar screen which is positioned approximately horizontally and adjacent the apertures from which the pulp is discharged.

(II) The solids to be screened are substantially dispersed on the entire surface of the screen by the flow energy of water, and thus a very wide surface of the screen is utilized.

(III) The solids to be screened, move at velocities which are related to their size or specific gravity under the action of the flow energy of the water while in dispersed condition. The particles which are finer than the mesh of the screen are urged by the water flowing through the screen to pass between the coarse particle grains in dispersed state and pass down through the mesh, accompanied by the water.

(IV) The particle grains which are coarser than the mesh of the screen, though they tend to stay on the mesh, are washed forward by the energy of the jet stream of water. Even if there may be some particles remaining, they are pushed along by solids in the jet stream. The jet stream of water thereby exercises a cleaning action keeping the surface of the screen always in a clean condition.

(V) As the mesh size gets smaller, for example it is as small as 0.15 mm. or about 100 mesh, the friction of the wires of the screen against the grains renders it difficult for fine grains to pass through the screen, however, the water in the jet stream serves as a lubricant for the frictional resistance. Even with apparatus for classifying, screening, dewatering and recovering wherein a screen with a mesh of 0.15 mm., is used operation on an industrial scale is possible.

(VI) As the solids to be screened are ejected under a predetermined pressure (below 90 cm. by water head) from the flat rectangular apertures together with water which is several times to tens of times the weight of the solids, the shape of the cross section of the jet stream, at the start of ejection, is the same shape as that of the flat rectangular apertures. The next sequential cross section of the jet stream is that of a longitudinal blade. The upper portion of the longitudinal blade takes the shape of a normal blade, the lower portion of the longitudinal blade being prevented from assuming the normal shape of a blade because of the screen. Thus the water in the lower portion of the longitudinal blade passes through the screen meshes. The water passes through the screen under the action of an impulse force which is added to the weight of the water thereby permitting the water to readily pass through the screen. Under the influence of the resultant force of impulse and weight, about 70% of the whole volume of the water ejected from the flat rectangular apertures comes down below the screen from the surface of the screen in short range within about 50 cm. from the rectangular apertures. About 30% of the remainder of the whole volume of water constitutes an over-product which advances toward the end of the screen by the energy of the jet stream. The water is continually passing through the screen under its weight, accompanied by various grains varying from minute grains in the over-product to grains of a size near that of the mesh, such that about 90–95% of water in the jet stream is dewatered at a short range of about 1 m. from the rectangular apertures on the fixed plane screen. To insure a realization of such a function and a method, a special technique is necessary which is based on experience, of varying properly the hydraulic pressure and the size of the rectangular apertures in accordance with the size of the mesh, and solid contents in the pulp. Lastly, the remaining 5–10% water of the over-product is sent to an auxiliary apparatus, which is a de-moisturing device.

(VII) The solids to be screened in the pulp touch the mesh by advancing obliquely to the mesh to the end of the screen and solids of a size equal to or larger than the mesh cannot pass through the same. Accordingly, clogging of the mesh seldom occurs.

(VIII) As a demoisturing apparatus, there is chiefly a vibratory screen. This device is closely connected with the classifying, screening, dewatering and recovering method of the present invention, but is not essential.

In case employment of a mechanical apparatus as a demoisturing device is uneconomical, that is, when there is little overproduct i.e., when the yield of recovery of the overproduct is below 0.5 ton per hour, the overproduct that is carried to the end of the screen is received in a coal receiver provided downward of the end of the screen, and the fine coals settled in the receiving box are often recovered by means of a scoop.

Other objects and advantages of the present invention will be more clearly seen from the following explanation made with reference to the accompanying drawing, wherein there is shown a perspective view of an apparatus for carrying out the method of the present invention; and In the drawing a pulp is supplied to a pulp tank 2 from a chute 1. The pulp tank 2 has a number of ejection apertures 3. Each aperture is of flat rectangular shape the width of which is about three times its height and the apertures are spaced from one another by a distance of about 1.5–2.0 times the height of the aperture and arranged along a transverse line at the lowermost portion of the front end of the pulp tank 2. The pulp discharged from the apertures runs rapidly along the surface of a stationary plane screen 4 placed in a substantially horizontal position. Screen 4 is a wire-net-screen or wedge-bar-screen with slits arranged in a transverse direction. An enervating plate 5 is provided in the pulp tank 2. The enervating plate 5 divides the interior of the tank into two chambers. The chamber on the side of plate 8 rearwardly of the apertures constitutes a large pulp reservoir in the back side and the chamber on the side of plate 8 in communication with the apertures constitutes a vertical canal path in the front side of the tank. Coal particles are cleaned, screened and dewatered on the stationary plane screen 4, the particles being advanced by the force of the water of the jet current from the plane screen 4 onto the vibratory screen 6.

Sometimes, for further screening, a water spray pipe 7 is provided over the vibratory screen 6 at a position where the coal products arrive at the vibratory screen 6 to dilute the remaining water by sprinkling and to remove any muddy slime and the remaining water. The overproducts that are removed by the remaining water are carried forward by the vibratory screen 6 receiving dewatering and demoisturing action during passage to the end of the screen 6 and then are discharged from the end of the vibratory screen.

The classifying, screening, dewatering and recovering method of the present invention is a method wherein a hydraulic pulp tank is used and pulp ejected under a predetermined hydraulic pressure by utilizing the hydraulic pressure created when the pulp fed into the tank has reached a predetermined water head. Because such methods as widening the pulp tank, increasing the number of ejection apertures and widening the width of the stationary plane screen can be adopted, the method and the apparatus of the present invention have no limits as to the total amount of the water to be treated. Naturally, however, there are limits respectively to the capacity of treatment of the unit width (1 m. wide) of the pulp tank in accordance with the size of the mesh of the screen to be used.

In general, at coal washing plants, screening and dewatering operations are carried out with the use of a screen of mesh of various sizes, and with conventional screening apparatus, the screening operation consisting of screening the grains according to their size, independently of the differences of specific gravity of grains.

With the use of the method and the apparatus of the present invention, there is obtained an advantage that, besides screening and dewatering operations, a classification or cleaning operation can be effected simultaneously, when the size of the solids to be screened is below 1 mm.

It is because of the influence of the enervating plate installed in the pulp tank that this classifying operation is effected. The enervating plate is disposed about 6 cm. from the front plate of the pulp tank. Without the enervating plate, the jet current adjacent the location where the pulp is fed to the tank would be elongated, and the length of all the jet currents would not be uniform and equal. The enervating plate prevents this unequality. In other words, the pulp is forced to overflow over the enervating plate 8 whereupon the length of flow of every element of the pulp as measured from the top of the enervating plate to the apertures is substantially equal. The enervating plate influences the classifying operation as shown from the following theoretical consideration.

The interior of the pulp tank is divided by the enervating plate in a capacity ratio of about 1:10 or 1:15, the narrow portion forming a path having a cross sectional shape of an elongated slot. The height of the upper edge of the enervating plate is arranged to be about 6 cm. lower than the predetermined surface of the water in the pulp tank.

By virtue of the presence of the enervating plate, the rough-grained solids in the pulp remain and settle in the reservoir in the back part of the tank. The settled solids are stirred by the discharge of the pulp into the interior of the tank, the kinetic energy of the pulp being transformed into a turbulent stirring action. Thereafter, the pulp advances in a gentle downward current towards the rectangular orifices by passing over the edge of the enervating plate thus becoming free from the turbulence caused by the introduction of the pulp into the tank. It is understood that the particles will be dispersed in the pulp in homogeneous fashion in the narrow front portion of the tank.

In the vertical downward current, the solids in the pulp fall in free falling condition with the particles settling at a velocity according to their size and specific gravity. Accordingly, the solids in the pulp are classified. Thus, considering particles of identical size, it is noted that the refuse with a larger specific gravity falls at a greater velocity than coal which has a smaller specific gravity and consequently falls with a slower speed. The vertical downward current is turned in a direction horizontally in the flat rectangular apertures to issue therefrom as a horizontal current. As the current changes direction the particles having the larger downward velocities (the refuse) are turned through a larger radius and are discharged from the lowermost portions of the rectangular apertures. Similarly, the coal particles having relatively slower velocities are discharged through the apertures at the uppermost portions thereof. Consequently, a depthwise graduation of the particles according to their specific gravities is obtained in the pulp discharged from the apertures. Through this graduation or classification, the denser refuse which is of a size finer than the mesh size of the screen, and which is flowing at the lower portion of the jet current, is passed together with water successively through the screen. Coal particles though, even of the same size of the refuse, flows at the upper portion of the jet current and is carried farther in the jet current. The very fine grains of coal are carried to the end of the screen, being unable to pass through the screen because of the small quantity of water remaining on the screen. Thus, classifying, screening and dewatering are effectively carried out on the pulp.

The theoretical considerations above are substantiated by the list of results (Table I, II) by analyzing, according to specific gravity and particle size respectively, the overproduct of the screen and the underproduct of the screen obtained through employment of the method and the apparatus of the present invention.

Generally, in the horizontal current, coal flows at its upper portion, and refuse flows at its lower portion, as is commonly known. The classification at the flat rectangular aperture helps the classification of the horizontal current to be more pronounced.

Results obtained by the method and the apparatus of the present invention are shown by performance data given by way of example.

The first example:
The apparatus shown in FIG. 1 is fed with the overflow by a hydrocyclone which treats the underflow from a thickener.

A bronze square-mesh screen is used, the mesh size being 0.25 x 0.37 mm. The fixed plane screen is 0.3 m. long and 1.2 m. wide, and the vibratory screen 2.8 m. long and 1.2 m. wide. The pulp which has a solids content of 10.07% is projected horizontally under a pressure of 0.81 meter water gauge. The results obtained are given in Table I and II.

Underneath the fixed plane screen, some 70% of the drainage water is recovered, 20% more below the first meter of the vibratory screen and the last 10% below the following 70 cm. of the screen. The solids content of these pulps are respectively 8.86%, 10.70% and 3.55%. The moisture content of the overflow is approximately 25% and the rate of feeding 60 cu. m. per hour.

*Table I.—Grading Rate and Analysis of Solids in the Pulp*

| Specific gravity | | Grain size (mesh) | | | | | |
|---|---|---|---|---|---|---|---|
| | | 30–65 | 65–100 | 100–150 | 150–200 | –200 | Total |
| –1.4 | Weight percent | 7.60 | 9.38 | 5.48 | 1.58 | 2.74 | 26.87 |
| | Ash percent | 15.46 | 8.52 | 11.03 | 12.72 | 36.91 | 14.16 |
| –1.6 | Weight percent | 13.60 | 23.60 | 10.96 | 2.43 | 8.85 | 59.44 |
| | Ash percent | 24.39 | 25.66 | 20.45 | 25.21 | 45.41 | 27.33 |
| +1.6 | Weight percent | 0.21 | 0.42 | 1.79 | 2.21 | 9.06 | 13.69 |
| | Ash percent | 36.93 | 37.98 | 41.15 | 40.31 | 54.12 | 49.44 |
| Total | Weight percent | 21.50 | 33.40 | 18.23 | 6.22 | 20.65 | 100.00 |
| | Ash percent | 21.32 | 21.00 | 19.65 | 27.40 | 48.10 | 26.82 |

*Table II.—Screening*

OVERSIZE (RECOVERED COAL)

| Specific gravity | | Grain size (mesh) | | | | | |
|---|---|---|---|---|---|---|---|
| | | 30–65 | 65–100 | 100–150 | 150–200 | –200 | Total |
| –1.4 | Weight percent | 64.38 | 23.17 | 8.02 | 1.60 | 0.74 | 97.91 |
| | Ash percent | 4.08 | 4.84 | 4.83 | 5.41 | 11.10 | 4.40 |
| –1.6 | Weight percent | 0.14 | 0.56 | 0.49 | 0.14 | 0.21 | 1.54 |
| | Ash percent | 23.58 | 23.96 | 20.92 | 17.19 | 16.82 | 21.37 |
| +1.6 | Weight percent | 0.03 | 0.04 | 0.21 | 0.14 | 0.13 | 0.55 |
| | Ash percent | 54.34 | 45.52 | 46.88 | 49.89 | 47.31 | 48.06 |
| Total | Weight percent | 64.55 | 23.77 | 8.72 | 1.88 | 1.08 | 100.00 |
| | Ash percent | 4.15 | 5.36 | 6.75 | 9.60 | 16.57 | 4.90 |

UNDERSIZE (IN THE STARTING ZONE OF JET STREAM)

| Specific gravity | | Grain size (mesh) | | | | | |
|---|---|---|---|---|---|---|---|
| | | 30–65 | 65–100 | 100–150 | 150–200 | –200 | Total |
| –1.4 | Weight percent | 0.80 | 1.78 | 0.71 | 0.18 | 0.53 | 4.00 |
| | Ash percent | 10.31 | 8.79 | 11.63 | 11.47 | 42.60 | 14.42 |
| –1.6 | Weight percent | 9.25 | 11.91 | 21.16 | 13.38 | 18.85 | 72.55 |
| | Ash percent | 28.31 | 28.03 | 26.74 | 25.84 | 47.40 | 32.38 |
| +1.6 | Weight percent | 0.53 | 0.53 | 3.55 | 3.55 | 15.29 | 23.45 |
| | Ash percent | 37.52 | 37.83 | 36.14 | 33.88 | 51.12 | 45.63 |
| Total | Weight percent | 10.58 | 14.22 | 25.42 | 15.11 | 34.67 | 100.00 |
| | Ash percent | 27.41 | 25.99 | 27.63 | 29.13 | 50.29 | 34.77 |

UNDERSIZE (IN THE MIDDLE ZONE OF JET STREAM)

| Specific gravity | | Grain size (mesh) | | | | | |
|---|---|---|---|---|---|---|---|
| | | 30–65 | 65–100 | 100–150 | 150–200 | –200 | Total |
| –1.4 | Weight percent | 3.02 | 12.76 | 8.34 | 2.41 | 3.87 | 30.40 |
| | Ash percent | 12.64 | 9.49 | 11.47 | 15.19 | 24.05 | 14.94 |
| –1.6 | Weight percent | 9.45 | 20.40 | 14.17 | 7.94 | 7.94 | 59.90 |
| | Ash percent | 26.81 | 29.82 | 22.77 | 34.40 | 51.26 | 31.13 |
| +1.6 | Weight percent | 0.29 | 0.56 | 2.31 | 2.82 | 3.72 | 9.70 |
| | Ash percent | 40.31 | 37.91 | 38.70 | 43.32 | 55.63 | 46.54 |
| Total | Weight percent | 12.76 | 33.72 | 24.82 | 13.17 | 15.53 | 100.00 |
| | Ash percent | 23.76 | 22.26 | 20.46 | 32.79 | 50.01 | 27.70 |

UNDERSIZE (IN THE ENDING ZONE OF JET STREAM)

| Specific gravity | | Grain size (mesh) | | | | | |
|---|---|---|---|---|---|---|---|
| | | 30–65 | 65–100 | 100–150 | 150–200 | –200 | Total |
| –1.4 | Weight percent | 2.18 | 4.90 | 1.64 | 0.27 | 0.82 | 9.81 |
| | Ash percent | 11.30 | 10.40 | 13.63 | 21.23 | 42.22 | 14.10 |
| –1.6 | Weight percent | 13.89 | 28.05 | 17.70 | 6.53 | 10.08 | 76.25 |
| | Ash percent | 25.56 | 27.50 | 22.67 | 34.18 | 42.45 | 28.57 |
| +1.6 | Weight percent | 0.41 | 0.46 | 2.45 | 1.91 | 8.71 | 13.94 |
| | Ash percent | 42.78 | 37.00 | 31.36 | 31.21 | 45.24 | 40.53 |
| Total | Weight percent | 16.48 | 33.41 | 21.79 | 8.71 | 19.61 | 100.00 |
| | Ash percent | 24.10 | 25.12 | 22.97 | 33.13 | 43.68 | 28.82 |

Note: In Table II "Undersize in the starting zone of jet stream" refers to solids in the water under the screen within a 0.3 m. distance from the jet apertures.

"Undersize in the middle zone of jet stream" refers to solids in the water under the screen within a 1.3 m. distance from the jet apertures.

"Undersize in the ending zone of jet stream" indicates underwater solids under the screen a 2 m. distance from the jet apertures.

The inventor now examines, on the basis of these results, the performance of an apparatus of the present invention in classifying, screening and dewatering.

A. Classifying: A reduction in the ash content is observed in each of the size fractions of the screen overflow. Consequently, the method and the apparatus have a classifying effect.

B. Screening: The screen overflow contains coal of good quality, with a size below the screen mesh, down to 0.1 mm. The actual screening efficiency is thus not satisfactory.

C. Dewatering: The overflow contains approximately 25% of water, which is normal for a product of this size distribution.

The second example: The second example as shown in Table III, discussed below, deals with an apparatus of the present invention which is overloaded. The invention is to recover coal of average quality from a large quantity of water, at the expense of some efficiency in cleaning, screening and dewatering.

The installation consists of a fixed plane screen of considerable length followed by a vibratory screen. The installation treats the overflow from a bucket elevator boot thickened in a tank.

The characteristics of the installation are as set out below:

Fixed plane screen: 1.8 m. long x 1.2 meters wide, fitted with a nylon cloth of 0.25 mm. mesh.
Vibrating screen: 2.5 m. long x 0.9 m. wide also fitted with a nylon screen on 0.25 mm. mesh.
Pulp tank: 0.75 m. long x 1.2 m. wide x 0.9 m. deep.
Apertures: 5 holes, 15 mm. high x 45 mm. wide.
Quantity of pulp: 2.5 cu.m./minute.
Amount of product recovered: An average of 2.5 tons/hour.

*Table III.—Screening Result and Analysis*

| Size (mesh) | Pulp | | Oversize (recovered) coal | | Undersize of fixed screen | | Undersize of vibrating screen | |
|---|---|---|---|---|---|---|---|---|
| | Weight percent | Ash percent | Weight percent | Ash percent | Weight percent | Ash percent | Weight percent | Ash percent |
| +35 | 9.1 | 17.8 | 28.2 | 6.0 | 0.6 | 19.1 | 0.9 | 25.1 |
| +65 | 12.3 | 20.8 | 39.3 | 11.1 | 0.9 | 22.2 | 1.2 | 23.2 |
| +100 | 19.3 | 23.2 | 18.4 | 21.2 | 36.7 | 34.7 | 31.6 | 39.7 |
| −100 | 59.3 | 50.6 | 14.1 | 34.9 | 61.8 | 56.7 | 66.3 | 57.3 |
| Total | 100.0 | 38.7 | 100.0 | 14.9 | 100.0 | 47.8 | 100.0 | 51.0 |
| Consistency, percent | 6.58 | | 64.33 | | 4.2 | | 8.0 | |
| Particles, ton/h | 6.9 | | 2.1 | | 3.85 | | 3.95 | |

Note.— Showering water is not used.

The normal screening methods are no longer applicable when the mesh becomes very small. The creation of jet current in the process of the present invention makes it possible for classifying to be carried out down to very fine mesh size.

In the method and the apparatus of the present invention, a fixed plane screen fitted approximately horizontally is indispensable, and it cannot be substituted for by a vibratory screen, a swinging screen or a fixed screen inclining sharply.

When a vibratory screen or a swinging screen is used as a substitution screen in the apparatus of the present screen, a greater part of the water in the jet current falls below the screen before completion of screening and, neither classifying nor screening can be carried out, dewatering only being possible. Besides, more clogging of the mesh makes the continuous use of it impossible.

As a reason why clogging of the mesh of the screen is avoided in the method and apparatus of the present invention, it is pointed out that the solids to be screened advances in a direction diagonal or oblique to the mesh of the fixed screen, while with a swinging screen, the grains of the same size as the mesh size are mechanically pushed into the meshes, thus clogging the meshes.

When a sharply inclined fixed screen is positioned adjacent the pulp tank, as the jet current is ejected under hydraulic pressure from the jet aperture it describes a parabola, such that when the current contacts the screen, the water passes below the screen before it is screened, and at the same time, continuous working for long periods is made impossible because of the wear of the screen net at the locations where the current contacts the same. Furthermore, many of the meshes of the screen at said location are clogged under the action of the force of the water causing wedging of the particles in the mesh.

The characteristics of the method and the apparatus of the present invention may be summarized as follows:

(1) The operations of classifying, screening, dewatering and recovering are carried out by a very simple apparatus using only a single tank and a single screen. The operation is continuous without need for external mechanical power.

(2) Classifying, screening, dewatering and recovering are carried out on the screen surface of a single fixed screen, all simultaneously and in an unprecedented distance of only about 1 m.

(3) The method and the apparatus of the present invention make unusual use of natural power and natural phenomena, without using any mechanical power. There are no movable parts.

(4) The method and the apparatus of the present invention satisfy the five conditions of wet screening essential to the screening of moist fine coal.

(5) The method and apparatus of the present invention have a large processing rate when compared with their low coast of installation.

For example, to recover coal of more than 30 mesh from the pulp 10 m.³/min. the width of the mesh can be 5 m. Consequently, the invention provides methods and apparatus wherein treatment with a fixed plane screen of 5 m.² is possible.

(6) In the method and the apparatus prolonged continuous operation is possible, and the operating cost, the maintenance cost and wear are small.

(7) In the method and the apparatus of the present invention, operation on an industrial scale is possible when the size of screen mesh is down to 100 mesh (about 0.15 mm. mesh).

(8) With the use of the method and the apparatus of the present invention, the profit of a coal mine will be increased. In a coal washing plant where fine coal is recovered through such reconstruction as may make the use of the method and the apparatus of the present invention possible, coal is recovered at a calorific value which is 400–600 calories higher than that gained in conventional methods. This results from the cleaning operation.

When, in an ore washing plant, fine ore is dealt with, the overflow is refuse, and the underflow is ore, and it will not be necessary to explain that it is just the reverse of the case of a coal washing plant.

What is claimed is:

1. Apparatus for classifying, screening, dewatering and recovering finely divided particles of coal and ore in a coal washing plant, ore washing plant and the like, comprising a hydraulic pressure pulp tank having a front end, a stationary planar screen extending longitudinally from said tank and constituted by transversely extending spaced elements, said screen being positioned approximately horizontally and adjacent the lowermost portion of the front end of said pulp tank, an enervating plate in said tank dividing the interior thereof into two chambers, one of said chambers constituting a large pulp reservoir rearwardly of the plate, the other chamber being a vertically narrow canal path forwardly of said plate, said tank including a front wall having a plurality of flat rectangular ejection apertures situated transversely in a row at the lower front end of said tank and in communication with said vertical narrow canal path, said apertures being positioned adjacent said screen and causing a rapid horizontal jet stream of pulp to be issued along the planar screen wherein the particles are graduated depthwise in the stream in proportion to the density of the particles.

2. A process for screening, dewatering and recovering finely divided particles in a washing plant characterized by a stationary planar screen of determinable mesh positioned approximately horizontally and adjacent a lowermost portion of the front end of a hydraulic pressure pulp tank, said pulp tank being provided at its lower part facing the screen with a plurality of flat rectangular ejection apertures, said process comprising ejecting horizontally a stream of water and particles in the form of pulp from each of said ejection apertures along the surface of the planar screen under a determinable hydraulic pressure in which stream said particles are graduated depthwise in proportion to their specific gravities, the stream of pulp being ejected from said apertures and passing in a substantial quantity downwardly through the screen in a zone adjacent the apertures along with only relatively dense particles having a size smaller than the mesh of the screen, the remainder of the water and particles being advanced along the screen, spreading the remainder of the particles widely across the screen by the energy of the remainder of the water while rapidly advancing the particles forwardly along the screen by the energy of the remaining water, the particles which are of relatively great density and of a size smaller than the mesh passing through the screen, while the relatively light particles are advanced along the length of the screen to constitute an overproduct.

References Cited in the file of this patent

UNITED STATES PATENTS

| 319,657 | Yelmini | June 9, 1885 |
| 1,421,984 | Ondra | July 4, 1922 |
| 2,917,174 | Fontein | Dec. 15, 1959 |

FOREIGN PATENTS

| 424,258 | Great Britain | Feb. 13, 1935 |
| 926,341 | Germany | Apr. 14, 1955 |